(12) United States Patent
Nakamura

(10) Patent No.: US 7,027,889 B2
(45) Date of Patent: Apr. 11, 2006

(54) AUTOMATIC PROGRAMMING APPARATUS FOR GENERATING A NUMERICAL CONTROL PROGRAM FOR CONTROLLING A CUTTING TOOL

(75) Inventor: Takayuki Nakamura, Yamatokoriyama (JP)

(73) Assignees: Mori Seiki Co., Ltd., Nara (JP); Intelligent Manufacturing Systems International, Sacramento, CA (US)

( * ) Notice: Subject to any disclaimer, the term of this patent is extended or adjusted under 35 U.S.C. 154(b) by 0 days.

(21) Appl. No.: 10/811,831

(22) Filed: Mar. 30, 2004

(65) Prior Publication Data

US 2004/0204786 A1   Oct. 14, 2004

(30) Foreign Application Priority Data

Apr. 8, 2003   (JP)  ............................. 2003-104005

(51) Int. Cl.
*G06F 19/00*   (2006.01)

(52) U.S. Cl. ...................... 700/181; 700/173; 700/182; 700/183

(58) Field of Classification Search ................ 700/160, 700/172–176, 179, 181, 182, 183, 190, 191
See application file for complete search history.

(56) References Cited

U.S. PATENT DOCUMENTS

| | | | | | |
|---|---|---|---|---|---|
| 5,289,382 | A | * | 2/1994 | Goto | 700/179 |
| 5,815,400 | A | * | 9/1998 | Hirai et al. | 700/173 |
| 6,112,133 | A | * | 8/2000 | Fishman | 700/182 |
| 6,824,336 | B1 | * | 11/2004 | Izutsu et al. | 409/132 |
| 6,957,123 | B1 | * | 10/2005 | Nakamura | 700/181 |
| 2002/0164221 | A1 | * | 11/2002 | Izutsu et al. | 409/132 |
| 2003/0170085 | A1 | * | 9/2003 | Kakino et al. | 409/132 |
| 2003/0171842 | A1 | * | 9/2003 | Teramoto et al. | 700/182 |

FOREIGN PATENT DOCUMENTS

JP          5-228786        9/1993

* cited by examiner

*Primary Examiner*—Paul Rodriguez
(74) *Attorney, Agent, or Firm*—Westerman, Hattori, Daniels & Adrian, LLP

(57) ABSTRACT

An automatic programming apparatus 1 comprises: storing sections 11, 12, 13, and 14 for storing shape data of a product having a recess and a protrusion formed in the bottom surface inside the recess, workpiece data, tool data, and machining condition data; a concave portion machining tool storing section 15 for storing the identification data of a plurality of tools selected in advance as tools to be used for the machining of the recess; a CL data generating section 16 for referring to the identification data, thereby setting a plurality of tool combinations, and then generating CL data of the recess for each combination; a machining time calculating section 18 for calculating the machining time for each combination on the basis of the CL data; and an NC program generating section 20 for generating an NC program by using the CL data having the minimum machining time.

2 Claims, 11 Drawing Sheets

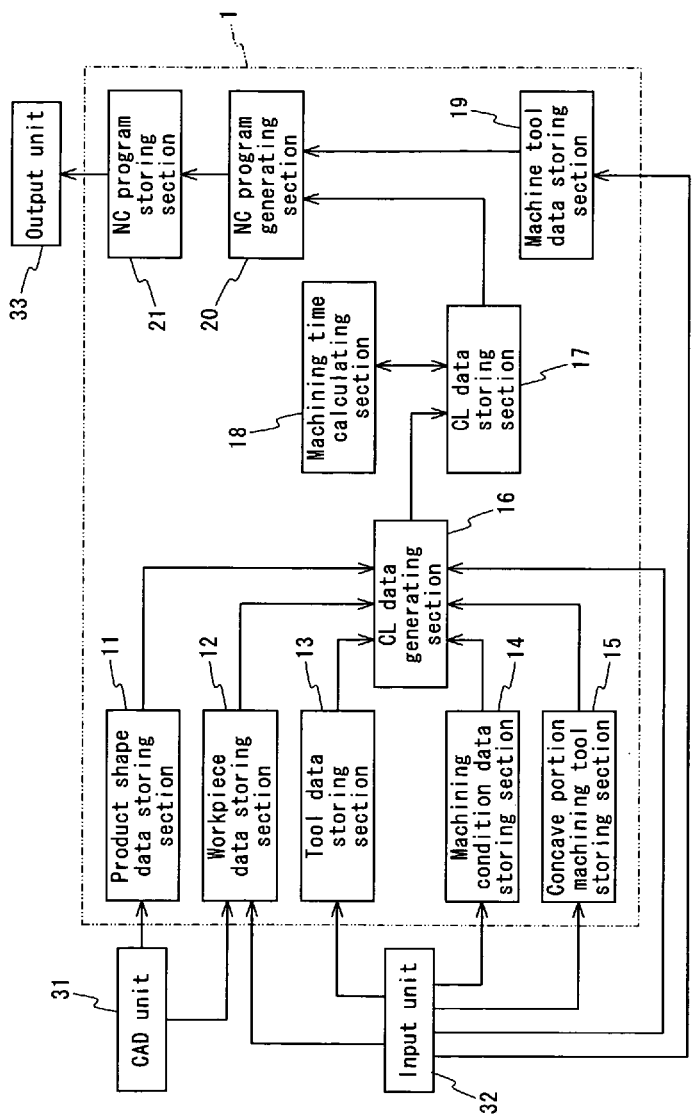
F I G. 1

F I G. 5

Face

| Face number | Edge number |
|---|---|
| F1 | E1, E2, E3, E4 |
| F2 | E5, E6, E7, E8 |
| F3 | E1, E9, E5, E10 |
| ...... | |

Face equation

| Face number | Coefficients of equation |
|---|---|
| F1 | A1, B1, C1, D1 |
| F2 | A2, B2, C2, D2 |
| F3 | A3, B3, C3, D3 |
| ...... | |

Edge

| Edge number | Vertex number |
|---|---|
| E1 | V1, V2 |
| E2 | V2, V3 |
| E3 | V3, V4 |
| ...... | |

Edge equation

| Edge number | Coefficients of equation |
|---|---|
| E1 | a1, b1, c1, d1 |
| E2 | a2, b2, c2, d2 |
| E3 | a3, b3, c3, d3 |
| ...... | |

Vertex

| Vertex number | Coordinate values | | |
|---|---|---|---|
| | X | Y | Z |
| V1 | X1 | Y1 | Z1 |
| V2 | X2 | Y2 | Z2 |
| V3 | X3 | Y3 | Z3 |
| ...... | | | |

F I G. 6

| | Tool number | Type | Tool diameter | Tool length | Material |
|---|---|---|---|---|---|
| 1 | T0001 | End mill | φ20 | 50 | SKH |
| 2 | T0002 | Drill | φ10 | 50 | SKH |
| 3 | T0003 | Face mill | φ30 | 50 | SKH |
| 4 | T0004 | End mill | φ16 | 40 | SKH |
| 5 | T0005 | End mill | φ12 | 30 | SKH |
| 6 | T0006 | End mill | φ40 | 50 | SKH |
| 7 | T0007 | Drill | φ20 | 40 | SKH |
| 8 | T0008 | Face mill | φ20 | 40 | SKH |
| ⋯ | ⋯ | ⋯ | ⋯ | ⋯ | ⋯ |

FIG. 7

| Tool group A ||||
|---|---|---|---|
|  | Tool number | Type | Tool diameter |
| 1 | T0006 | End mill | φ40 |
| 2 | T0001 | End mill | φ20 |
| 3 | T0004 | End mill | φ16 |
| 4 | T0005 | End mill | φ12 |

| Tool group B ||||
|---|---|---|---|
|  | Tool number | Type | Tool diameter |
| 1 | T0010 | End mill | φ30 |
| 2 | T0015 | End mill | φ24 |
| 3 | T0004 | End mill | φ16 |
| 4 | T0005 | End mill | φ12 |

| Tool group C ||||
|---|---|---|---|
|  | Tool number | Type | Tool diameter |
| 1 | T0010 | End mill | φ30 |
| 2 | T0001 | End mill | φ20 |
| 3 | T0005 | End mill | φ12 |

AUTOMATIC PROGRAMMING APPARATUS FOR GENERATING A NUMERICAL CONTROL PROGRAM FOR CONTROLLING A CUTTING TOOL

BACKGROUND OF THE INVENTION

1. Field of the Invention

The present invention relates to an automatic programming apparatus for generating a numerical control (NC) program for numerically controlling a machine tool such as to cause a cutting tool to machine a workpiece into a product shape having a recess and one or more protrusions formed in the bottom surface inside the recess.

2. Description of the Prior Art

An example of the prior art of such automatic programming apparatuses is an automatic NC data generation apparatus shown in FIG. 14. As shown in the figure, the automatic NC data generation apparatus 60 comprises tool information storing means 61, shape recognizing means 62, machining region dividing means 63, tool selecting and tool path data generating means 64, and NC data generating means 65 (see Japanese Unexamined Patent Publication No. 5-228786).

The tool information storing means 61 stores, in advance, information containing at least the tool identification code and the tool diameter of each of a plurality of tools (such as end mills) used in the machining.

On the basis of computer aided design (CAD) data (product shape data) inputted appropriately, the shape recognizing means 62 performs the process of recognizing a product shape (the shape of a finished workpiece) having a recess and one or more protrusions formed in the bottom surface inside the recess. On the basis of this recognized product shape, the machining region dividing means 63 performs the process of dividing the shape of the workpiece into a plurality of machining regions each of which can be machined using a single tool.

The tool selecting and tool path data generating means 64 performs the process of selecting a tool to be used for each of the divided machining regions, from among the tools the information of which is stored in the tool information storing means 61, and then generating tool path data for the selected tool.

Specifically, for example, when a machining region is to be machined into the product 50 shape having a recess 51 and a protrusion 52 as shown in FIGS. 2 and 3, a concave surface 53 having the minimum curvature radius is first searched for from among a plurality of the concave surfaces 53 in the recess 51. Then, a tool having a diameter smaller than twice the curvature radius of the found concave surface 53 is extracted from the tool information storing means 61. Further, a wall 54 gap having the minimum spacing is searched for from among a plurality of the wall 54 gaps in the recess 51. Then, a tool having a diameter smaller than the distance of the found wall 54 gap is extracted from the tool information storing means 61.

Then, from among the extracted two tools, that having the smaller diameter is selected as one used for machining the machining region. Further, tool path data is generated for the selected tool. After that, the tool identification code and the tool path data of the selected tool are associated with each other, and then transmitted to the NC data generating means 65.

On the basis of the tool identification code and the tool path data of each machining region received from the tool selecting and tool path data generating means 64, the NC data generating means 65 generates a series of NC data for all the machining regions.

As such, in the generation of the tool path data in the automatic NC data generation apparatus 60, the minimum curvature radius of the concave surfaces 53 in the recess 51 and the minimum spacing of the wall 54 gaps in the recess 51 are recognized for each machining region, so that an appropriate tool to be used is selected automatically on the basis of this recognition. Then, tool path data is generated for the selected tool. On the basis of the tool path data generated for each machining region, NC data is generated for all the machining regions.

Nevertheless, according to the configuration of this automatic NC data generation apparatus 60, the recess 51 is machined using a single tool throughout the machining ranging from rough cutting to finishing. Further, the tool has a diameter smaller than the minimum curvature radius of the concave surfaces 53 in the recess 51 and smaller than the minimum spacing of the wall 54 gaps in the recess 51. This configuration is appropriate for finishing but not for rough cutting, because in rough cutting, when a portion to be cut off is larger than the tool diameter, a plurality of cutting operations become necessary in order to cut off the portion completely. This has the problem of a longer machining time.

That is, in rough cutting, if a tool having the largest applicable diameter was used, the number of necessary cutting operations would be reduced, and so would be the machining time. Nevertheless, such machining time reduction is not actually performed in the automatic NC data generation apparatus 60 described above.

Further, for the purpose of the optimum machining, in addition to the above-mentioned selection of the tool diameter, the shape and the material of the tool need to be selected or the tool length need to be set, depending on the material and the machining shape of the workpiece and the required machining accuracy. These selection and setting need the specialized knowledge or know-how of a machining specialist (user). Accordingly, in the selection of the tool to be used, it is preferable that the apparatus configuration allows the user to select appropriately the tool to be used.

The invention has been devised with considering these situations. An object of the invention is to provide an automatic programming apparatus for generating an NC program which permits efficient machining and which reflects the machining know-how of an individual user.

SUMMARY OF THE INVENTION

In order to achieve the above-mentioned object, the invention relates to an automatic programming apparatus for generating an NC program for causing a cutting tool to machine a workpiece into a product shape having a recess and one or more protrusions formed in the bottom surface inside the recess, said automatic programming apparatus comprising:

a product shape data storing section for storing shape data defining said product shape;

a workpiece data storing section for storing data concerning the workpiece such as the shape and the material of said workpiece;

a tool data storing section for storing data concerning the tool such as the type, the dimension, and the material of said tool;

a machining condition data storing section for storing data concerning a machining condition having been set depending on said workpiece and tool;

a cutter location (CL) data generating section for setting machining regions and then generating CL data containing at least a tool to be used, the feed speed thereof, and the traveling positions of said to-be-used tool in a work coordinate system for each of said machining regions having been set, on the basis of said data stored in said product shape data storing section, said workpiece data storing section, said tool data storing section, and said machining condition data storing section; and an NC program generating section for generating an NC program on the basis of the traveling positions in the work coordinate system contained in the CL data generated by said CL data generating section; wherein said automatic programming apparatus further comprises:

a concave portion machining tool storing section for storing the identification data of a plurality of tools that are selected in advance such as to be used for the machining of said recess from among the tools the data of which is stored in said tool data storing section, and that have diameters different from each other and include at least: a minimum diameter tool having a diameter smaller than twice the minimum curvature radius of the concave surfaces inside said recess of said product and than the minimum distance of the wall gaps inside said recess; and a tool having a larger diameter than the minimum diameter tool; and a machining time calculating section for calculating the machining time on the basis of the CL data generated by said CL data generating section; wherein when the machining region having been set is said recess, said CL data generating section performs successively: a combination setting process of referring to the identification data stored in said concave portion machining tool storing section, thereby extracting one or more tools from among a plurality of said tools selected in advance, and thereby setting a plurality of tool combinations including at least said minimum diameter tool; and a CL data generating process of generating, for each of said combinations having been set, rough cutting CL data for rough cutting performed by successive use of the tools in the descending order of tool diameter starting with the tool having the maximum diameter, and then generating finishing CL data for finishing performed by the use of said minimum diameter tool; wherein said machining time calculating section calculates the machining time for each of said combinations on the basis of the CL data generated for each of said combinations; and wherein said NC program generating section generates said NC program by using the CL data having the minimum machining time among those calculated by said machining time calculating section.

According to the invention, the product shape data storing section stores shape data defining the shape of a product having a recess and one or more protrusions formed in the bottom surface inside the recess. The shape data contains at least: vertex data expressed by coordinate values in three-dimensional space; equation data for expressing the edges each formed by joining two vertices; edge data for associating each edge with the two vertices; equation data for expressing the faces each formed by being surrounded by edges; and face data for associating each face with the edges.

The workpiece data storing section stores data concerning the workpiece such as the shape and the material of the workpiece. The tool data storing section stores data concerning the tool such as the tool type (for example, a drill, an end mill, and a face mill), the tool diameter, the tool length, the tool material, and the tool number.

The machining condition data storing section stores data concerning a machining condition. This machining condition data includes the feed rate (for example, the feed rate per tooth for the case of a face mill or an end mill, and the feed rate per revolution for the case of a drill) and the cutting speed of the tool, and is set for each tool depending on the machining process (such as rough cutting and finishing), the workpiece material, and the tool material.

The concave portion machining tool storing section stores the identification data of a plurality of tools that are selected in advance as tools (end mills) to be used for the machining of the recess from among the tools the data of which is stored in the tool data storing section, and that have diameters different from each other and include at least: a minimum diameter tool having a diameter smaller than twice the minimum curvature radius of the concave surfaces inside the recess of the product and than the minimum distance of the wall gaps inside the recess; and a tool having a larger diameter than the minimum diameter tool.

This tool selection is carried out appropriately by a user on the basis of the specialized knowledge or know-how of the user. As a result, a tool is selected that has a shape, a material, a tool length, and the like expected to be optimum for the machining depending on the workpiece material, the machining shape, the required machining accuracy, and the like. As indicated by the literal sense, the identification data indicates data for identifying the tool. This identification data may be composed of a tool number or the like.

On the basis of the various data stored in the product shape data storing section, the workpiece data storing section, the tool data storing section, the machining condition data storing section, and the concave portion machining tool storing section, the CL data generating section generates CL data containing at least a tool to be used, the feed speed thereof, and the traveling positions of the to-be-used tool in a work coordinate system.

Specifically, on the basis of the shape data stored in the product shape data storing section and the workpiece data stored in the workpiece data storing section, portions to be machined and their shape features are recognized, and then the order of machining is determined for the recognized portions to be machined.

Then, according to the determined order of machining, in each portion to be machined, it is determined whether the portion to be machined is an above-mentioned recess or not. When the portion is not the recess, tools to be used respectively in the rough cutting and the finishing of the portion to be machined are set on the basis of the workpiece material data stored in the workpiece data storing section and with reference to the data stored in the tool data storing section.

Then, the data stored in the machining condition data storing section is referred to, so that a machining condition corresponding to the tool having been set is set. On the basis of this machining condition having been set, data concerning the feed speed and the like of the tool is generated. Further, the traveling position data of the tool in the work coordinate system is generated respectively for the rough cutting and the finishing. As a result, CL data described above is obtained.

In contrast, when the portion to be machined is the recess, the identification data stored in the concave portion machining tool storing section is referred to, so that one or more tools are extracted from among a plurality of tools (selected tools) having been selected in advance, so that a plurality of tool combinations are set such as to include at least the minimum diameter tool described above.

For example, when the identification data of tools having diameters of φ40, φ20, φ16, and φ12 is stored in the concave portion machining tool storing section, one or more tools are appropriately selected from among these tools, such as to include at least the minimum diameter tool (the tool of φ12). Thus, a plurality of tool combinations which include the minimum diameter tool are set such as (1) the tools of φ40, φ20, φ16, and φ12, (2) the tools of φ40, φ20, and φ12, (3) the tools of φ40, φ16, and φ12, (4) the tools of φ40 and φ12, (5) the tools of φ20, φ16, and φ12, (6) the tools of φ20 and φ12, (7) the tools of φ16 and φ12, and (8) the tool of φ12.

Then, CL data for rough cutting is generated for each of the combinations having been set. That is, for each combination, tools are set such as to be used sequentially in the order from the maximum diameter tool within the combination to the minimum diameter tool. Then, the data stored in the machining condition data storing section is referred to, so that a machining condition is set in correspondence to the tool having been set. On the basis of the machining condition having been set, data concerning the rotational speed and the feed speed of the tool is generated, and then the traveling position data of the tool in the work coordinate system is generated, so that CL data for rough cutting is obtained.

For example, in the case of the combination of tools of φ40, φ20, and φ12, CL data for the use of the tool of φ40 is generated first. Then, CL data used for machining the remnant machining region by using the tool of φ20 is generated, and at last, CL data used for machining the still remnant machining region by using the tool of φ12 is generated.

Then, the minimum diameter tool (the tool of φ12, in this example) is set to be used, so that CL data for finishing is generated. That is, similarly to the above-mentioned procedure, the data stored in the machining condition data storing section is referred to, so that a machining condition is set in correspondence to the tool having been set. On the basis of the machining condition having been set, data concerning the rotational speed and the feed speed of the tool is generated, and then the traveling position data of the tool in the work coordinate system is generated, so that CL data for finishing is obtained.

As such, when the machining region is the recess, the CL data generating section generates rough cutting CL data for each of the tool combinations having been set from the above-mentioned selected tools, and then generates a piece of finishing CL data. When the machining region is not the recess, the CL data generating section generates a piece of rough cutting CL data and a piece of finishing CL data.

On the basis of each piece of the rough cutting CL data of the recess generated by the CL data generating section, the machining time calculating section calculates the machining time for each piece. Specifically, on the basis of the traveling positions and the feed speed of the tool contained in each piece of the CL data, as well as the time necessary for a tool change, the machining time calculating section calculates the machining time for each piece of the CL data.

Then, in the NC program generating section, as for the CL data for the rough cutting of the recess, the machining time values calculated by the machining time calculating section are referred to, so that the rough cutting CL data having the minimum machining time is adopted. As for the CL data for the finishing of the recess and the rough cutting and the finishing of the portion other than the recess, the unique CL data generated is used. Then, an NC program for the entirety of the machining is generated from the traveling positions in the work coordinate system contained in each piece of the CL data.

The work coordinate system indicates a coordinate system defined relative to the workpiece mounted on a machine tool.

As described above, according to the automatic programming apparatus of the invention, in the generation of the CL data of the rough cutting of the recess, one or more tools are selected from among the tools having been selected in advance such as to be used in the machining of the recess, so that a plurality of combinations of tools to be used are set. Then, CL data for the rough cutting is generated for each of the tool combinations, and then the machining time is calculated for each piece of the generated CL data for rough cutting. Then, in the generation of the NC program, the CL data having the minimum machining time is selected, so that an NC program is generated on the basis of the selected CL data.

As a result, this automatic programming apparatus having the above-mentioned configuration can generate an NC program permitting a reduction in the machining time and hence improving the efficiency in the machining, in comparison with those of the prior art automatic programming apparatus for machining the recess using a single tool throughout the machining ranging from rough cutting to finishing.

Further, in the selection of the tools, the person carrying out the machining can set the tool arbitrarily. Thus, the machining know-how of the person carrying out the setting can be reflected in the setting of the selected tools. This permits efficient generation of an NC program for the optimum machining.

In the automatic programming apparatus, the concave portion machining tool storing section may group into a tool group a plurality of the tools selected as those to be used for the machining of the recess, and then store the identification data of the constituent tools for each of the tool groups the constituent tools of which are different from each other. Further, the CL data generating section may receive from the outside a signal for selecting one from among a plurality of the tool groups, then refer to the identification data of the tool group corresponding to the selection signal, stored in the concave portion machining tool storing section, and thereby perform the combination setting process and the CL data generating process successively.

As a result, tools suitable for the machining of the recess are selected appropriately from among a plurality of the tool groups. This avoids advantageously the necessity of re-setting the selected tools, for example, in each time when a change occurs in the to-be-machined product shape.

BRIEF DESCRIPTION OF THE DRAWINGS

FIG. 1 is a block diagram showing schematic configuration of an automatic programming apparatus according to an embodiment of the invention.

FIG. 5 is a diagram illustrating the data structure of shape data stored in a product shape data storing section according to the present embodiment.

FIG. 6 is a diagram illustrating the data structure of tool data stored in a tool data storing section according to the present embodiment.

FIG. 7 is a diagram illustrating the data structure of data stored in a concave portion machining tool storing section according to the present embodiment.

DESCRIPTION OF THE PREFERRED EMBODIMENTS

Figure 2:
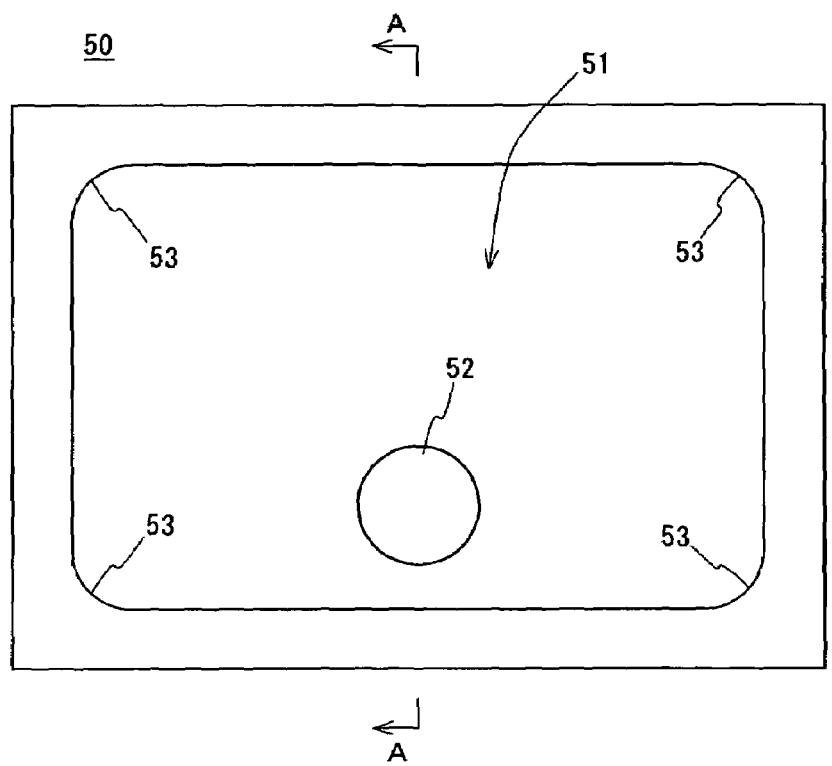
FIG. 2 is a plan view showing a product shape (after machining a workpiece) according to the present embodiment.

Preferred embodiments of the invention are described below with reference to the accompanying drawings. FIG. 1 is a block diagram showing schematic configuration of an automatic programming apparatus according to an embodiment of the invention.

As shown in FIG. 1, an automatic programming apparatus 1 according to the present embodiment comprises a product shape data storing section 11, a workpiece data storing section 12, a tool data storing section 13, a machining condition data storing section 14, a concave portion machining tool storing section 15, a CL data generating section 16, a CL data storing section 17, a machining time calculating section 18, a machine tool data storing section 19, an NC program generating section 20, and an NC program storing section 21.

The product shape data storing section 11 and the workpiece data storing section 12 are connected to a CAD unit 31. The workpiece data storing section 12, the tool data storing section 13, the machining condition data storing section 14, the concave portion machining tool storing section 15, the CL data generating section 16, and the machine tool data storing section 19 are connected to an input unit 32. The NC program storing section 21 is connected to an output unit 33.

Figure 3:
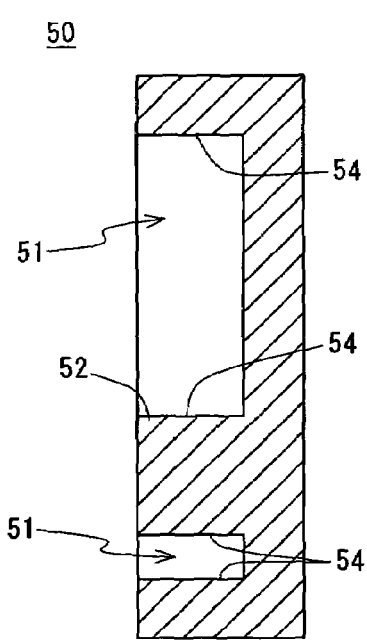
FIG. 3 is a cross sectional view of FIG. 2 in the A—A arrowed direction.

The product shape data storing section 11 stores product shape data generated by the CAD unit 31. In the present embodiment, shape data is stored that defines the shape of a product 50 having a recess 51 and a protrusion 52 formed in the bottom surface inside the recess 51, as shown in FIGS. 2 and 3.

The shape data includes: vertex data expressed by coordinate values in three-dimensional space; equation data for expressing the edges each formed by joining two vertices; edge data for associating each edge with the two vertices; equation data for expressing the faces each formed by being surrounded by edges; and face data for associating each face with the edges. In the case of a rectangular parallelpiped of FIG. 4, the data structure is as shown in FIG. 5.

The workpiece data storing section 12 stores data concerning the workpiece. The workpiece data includes the above-mentioned shape data and material of the workpiece, and is generated by the CAD unit 31 or inputted through the input unit 32, so as to be stored in the workpiece data storing section 12.

The tool data storing section 13 stores data concerning the tool. The tool data includes the tool type (for example, a drill, an end mill, and a face mill), the tool diameter, the tool length, the tool material, and the tool number, and is stored through the input unit 32 into the tool data storing section 13 in the form of a data table of FIG. 6 or the like.

The machining condition data storing section 14 stores data concerning a machining condition. This machining condition data includes the feed rate (for example, the feed rate per tooth for the case of a face mill or an end mill, and the feed rate per revolution for the case of a drill) and the cutting speed of the tool, and is set for each tool depending on the machining process (such as rough cutting and finishing), the workpiece material, and the tool material. This data is stored through the input unit 32 into the machining condition data storing section 14.

The concave portion machining tool storing section 15 groups into a tool group a plurality of tools selected as those to be used for the machining of the recess 51, and then stores the data concerning the constituent tools for each of the tool groups in the form of a data table of FIG. 7 or the like.

At least a part of the constituent tools are different between these groups. Each group includes at least: a minimum diameter tool having a diameter smaller than twice the minimum curvature radius of the concave surfaces 53 inside the recess 51 and than the minimum distance of the wall 54 gaps inside the recess 51; and a tool having a larger diameter than the minimum diameter tool.

This selection of the constituent tools of each group is carried out by a person who carries out the machining, on the basis of the machining know-how of the user. That is, tools which have a shape, a material, a tool length, and the like expected to be optimum for the machining depending on the workpiece material, the machining shape, the required machining accuracy, and the like are selected appropriately from among the tools stored in the tool data storing section 13. Then, these tools are grouped and then inputted through the input unit 32, so as to be stored in the concave portion machining tool storing section 15.

The data stored in the concave portion machining tool storing section 15 is not limited to that of FIG. 7, but needs to contain at least identification data for identifying the tools. In the embodiment of FIG. 7, the data concerning the tool number serves as the identification data.

On the basis of the various data stored in the product shape data storing section 11, the workpiece data storing section 12, the tool data storing section 13, the machining condition data storing section 14, and the concave portion machining tool storing section 15, the CL data generating section 16 generates CL data containing at least a tool to be used, the feed speed thereof, and the traveling positions of the to-be-used tool in a work coordinate system.

Figure 4:
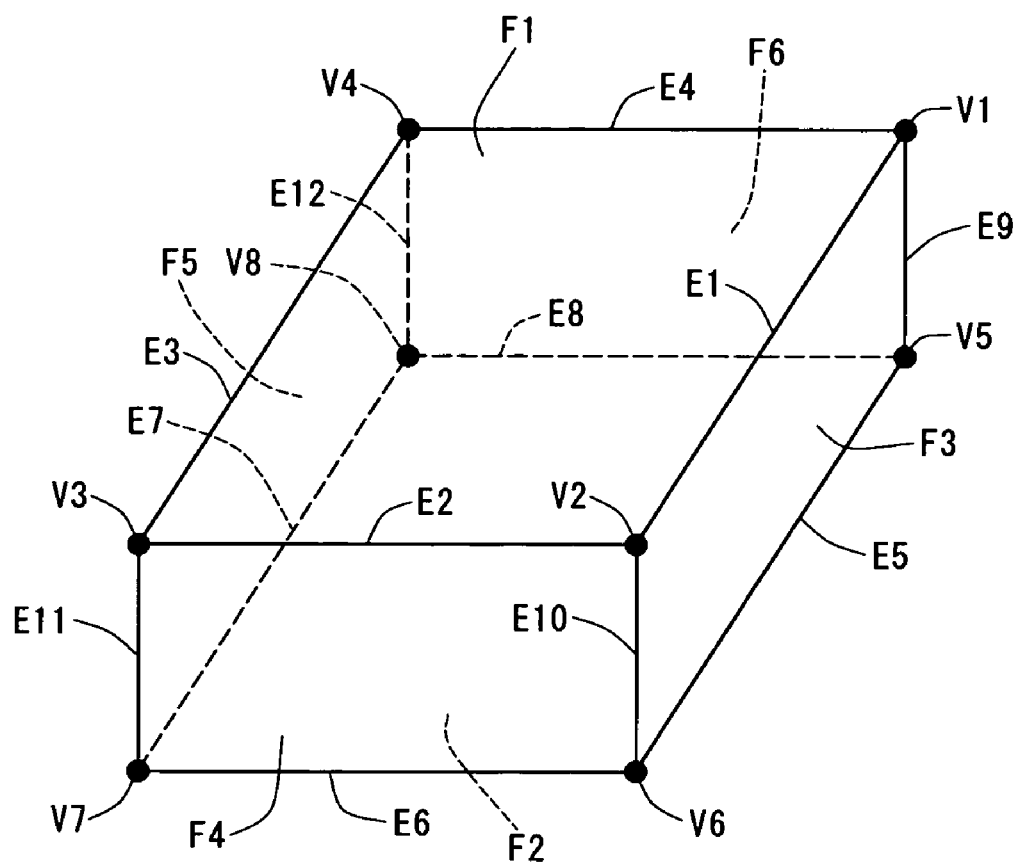
FIG. 4 is a diagram illustrating shape data according to the present embodiment.
Figure 8:
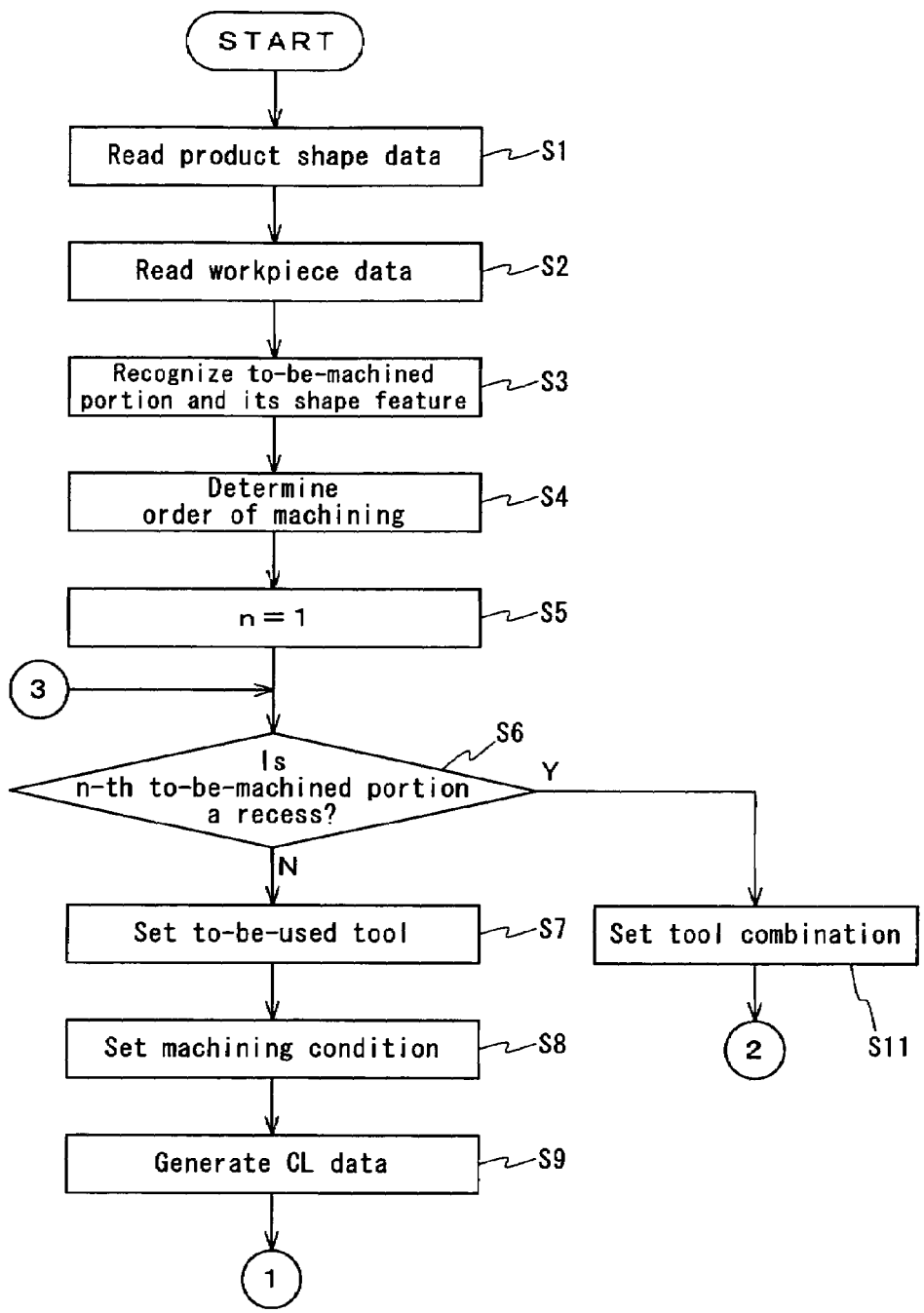
FIGS. 8 and 9 are flowcharts showing the procedure of processing in a CL data generating section according to the present embodiment.
Figure 9:
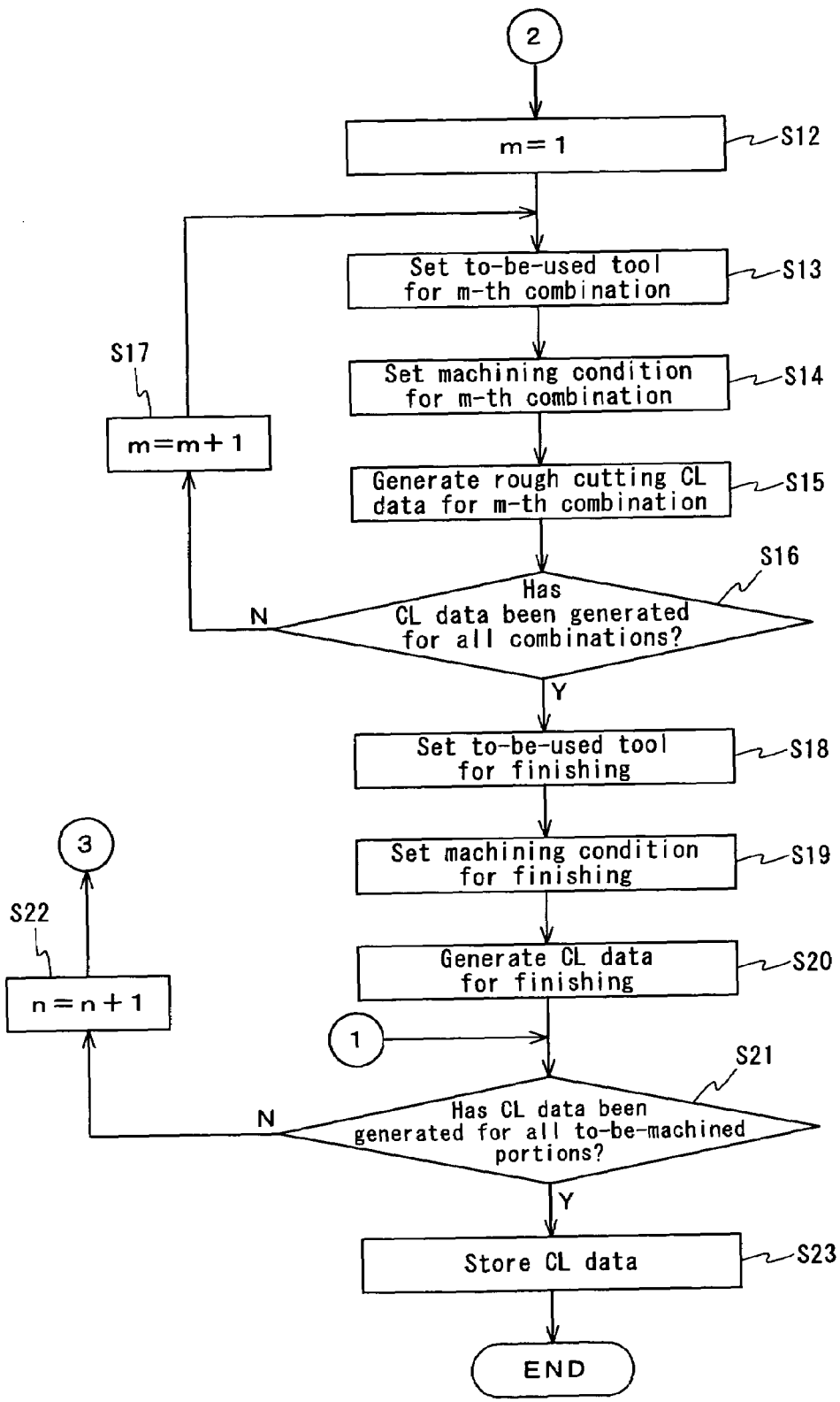

Specifically, the processes of FIGS. 8 and 9 are performed successively in this configuration. The following description is made for the case that a workpiece having the shape of FIG. 4 is machined into the product shape of FIGS. 2 and 3. In the description, it is assumed that a signal for selecting one from among a plurality of the tool groups stored in the concave portion machining tool storing section 15 is already inputted through the input unit 32 appropriately so as to be received by the CL data generating section 16.

The CL data generating section 16 reads first the shape data of the product 50 stored in the product shape data storing section 11 (step S1), and then reads the shape data and the material data of the workpiece from the workpiece data storing section 12 (step S2).

On the basis of the product shape data and the workpiece shape data having been read, portions to be machined and their shape features are recognized (step S3), and then the order of machining is determined for the recognized portions to be machined (step S4).

Then, a counter n is set to be unity (step S5). After that, for the first portion to be machined, it is determined whether the portion to be machined is an above-mentioned recess 51 or not (step S6). When the portion is not the recess 51, the procedure goes to step S7.

In step S7, a tool to be used in the machining are set on the basis of the workpiece material data and with reference to the data stored in the tool data storing section 13. For example, when the upper surface of the product 50 is to be machined, a face mill is set as the tool to be used. When the side surface of the product 50 is to be machined, an end mill is set as the tool to be used.

Then, on the basis of the workpiece material data and the to-be-used tool data, the data stored in the machining condition data storing section 14 is referred to, so that a machining condition is set for this portion to be machined (step S8).

On the basis of the data concerning this machining condition having been set, data concerning the rotational speed and the feed speed of the tool is generated, and then the traveling position data of the tool in the work coordinate system is generated, so that CL data for the portion to be machined is obtained (step S9). After that, the procedure goes to step S21.

The processes of steps S7–S9 are performed for respective machining processes of rough cutting and finishing, so that CL data is generated for each machining process.

In contrast, in the step S6, when the portion to be machined is determined as the recess 51, the identification data (tool number) stored in the concave portion machining tool storing section 15 and concerning the tool group corresponding to the selection signal inputted through the input unit 32 is referred to, so that one or more tools are extracted from the selected tool group, so that a plurality of tool combinations are set such as to include at least the minimum diameter tool described above (step S11).

For example, when the constituent tools of the selected tool group are composed of tools having diameters of φ40, φ20, φ16, and φ12 (in the case of tool group A), one or more tools are appropriately selected from among these tools, such as to include at least the minimum diameter tool (the tool of φ12). Thus, eight tool combinations which include the minimum diameter tool are set such as (1) the tools of φ40, φ20, φ16, and φ12, (2) the tools of φ40, φ20, and φ12, (3) the tools of φ40, φ16, and φ12, (4) the tools of φ40 and φ12, (5) the tools of φ20, φ16, and φ12, (6) the tools of φ20 and φ12, (7) the tools of φ16 and φ12, and (8) the tool of φ12.

Then, a counter m is set to be unity (step S12) After that, for the first combination, tools are set such as to be used sequentially in the order from the maximum diameter tool within the combination to the minimum diameter tool (step S13). Then, the workpiece material data stored in the workpiece data storing section 12, the tool data stored in the tool data storing section 13, the machining condition data stored in the machining condition data storing section 14 are referred to, so that a machining condition is set in correspondence to the to-be-used tool and the workpiece material (step S14). On the basis of the machining condition having been set, data concerning the rotational speed and the feed speed of the tool is generated, and then the traveling position data of the tool in the work coordinate system is generated, so that CL data for rough cutting is obtained (step S15).

Figure 10:
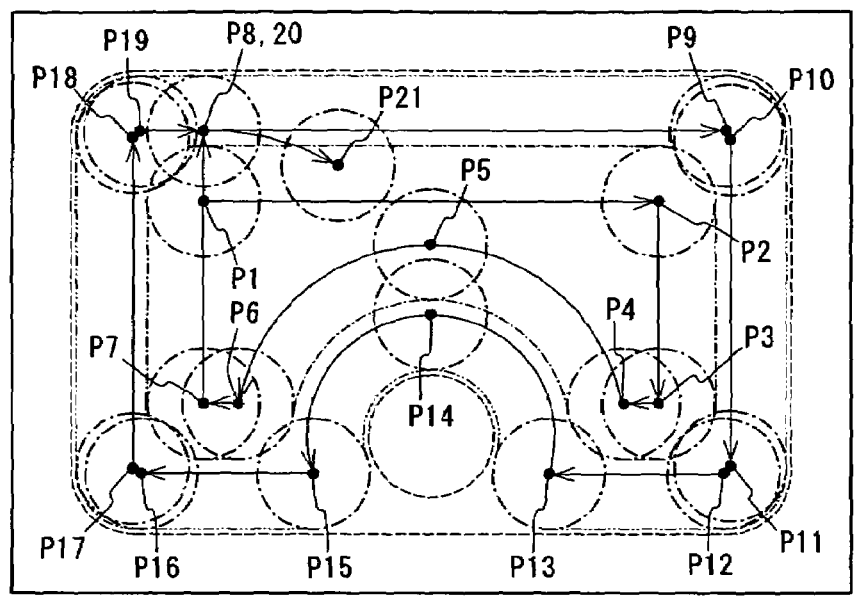
FIGS. 10–13 are diagrams illustrating a traveling path in CL data generated according to the present embodiment.

For example, in the case that the first combination having been set as described above is composed of the tools of φ40, φ20, φ16, and φ12, CL data for the use of the tool of φ40 is generated first. As shown in FIG. 10, the traveling path of the tool is set such as to form a shape generated by adding an appropriate finishing allowance to the shape of the recess 51 illustrated in dashed line, so that as a large region as possible is machined by the tool (the direction of the traveling path in the figure is P1→P21).

Figure 11:
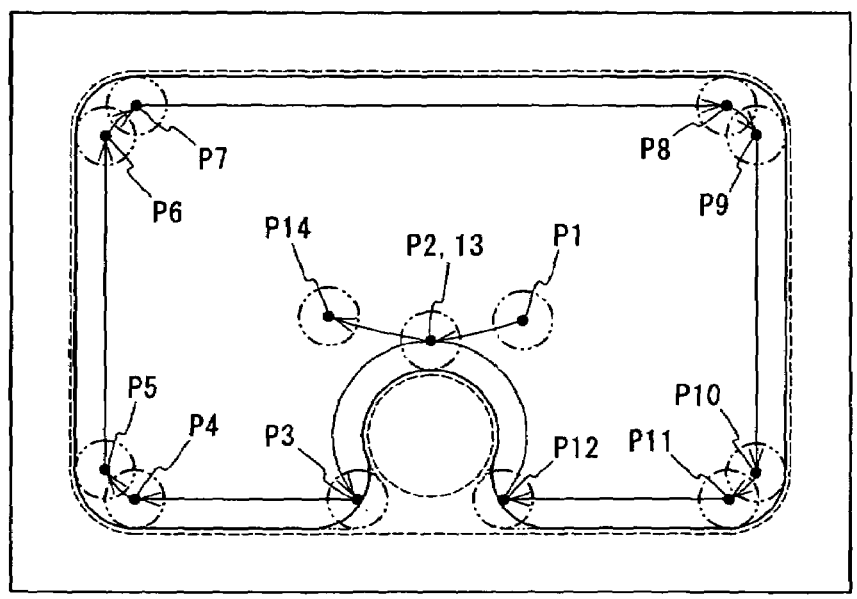
Figure 12:
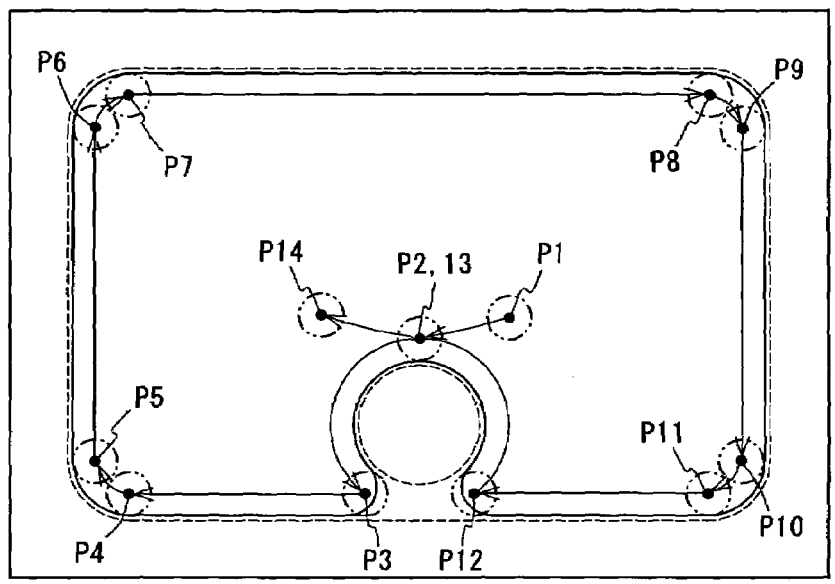
Figure 13:
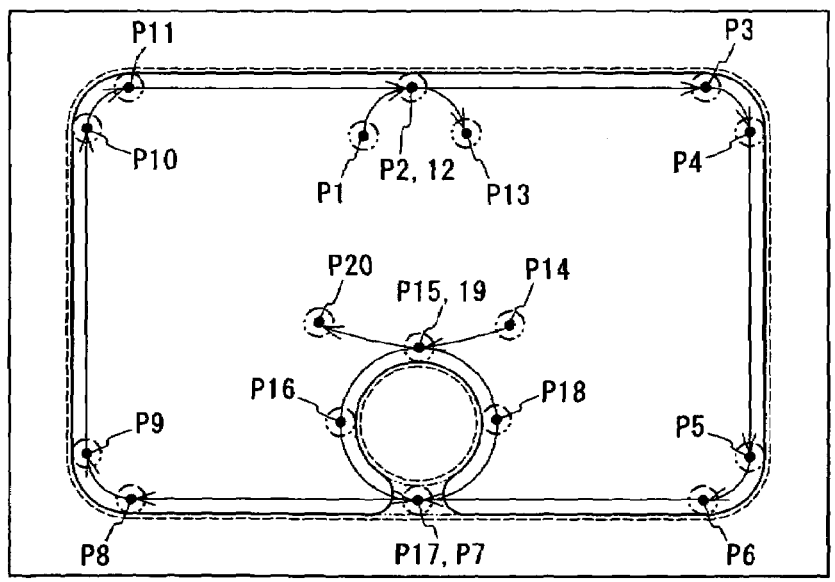
Figure 14:
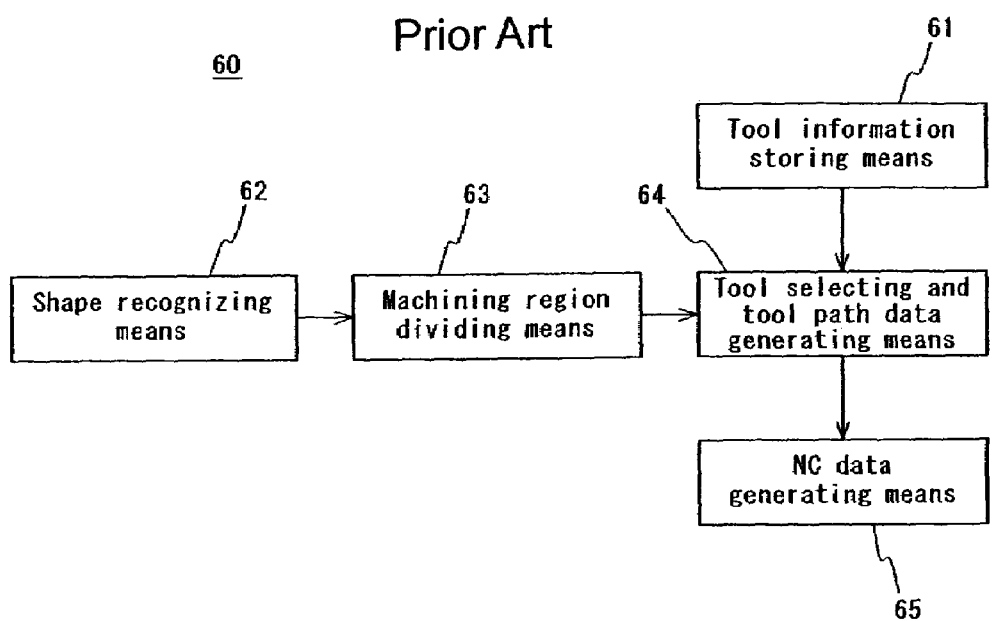
FIG. 14 is a block diagram showing schematic configuration of an automatic NC data generation apparatus according to the prior art.

Then, CL data used for the tool of φ20 for machining the remnant machining region not having been machined by the tool of φ40 is generated. Then, CL data used for the tool of φ16 for machining the remnant machining region not having been machined by the tool of φ20 is generated. At last, CL data used for the tool of φ12 for machining the remnant machining region not having been machined by the tool of φ16 but still maintaining a finishing allowance is generated. FIG. 11 shows the traveling path (P1→P14) of the tool of φ20. FIG. 12 shows the traveling path (P1→P14) of the tool of φ16. FIG. 13 shows the traveling path (P1→P13 and P14→P20) of the tool of φ12.

Obviously, the traveling path is not limited to these of FIGS. 10–13, and may be that generated by various logic. Further, in the present embodiment, the traveling path in the latter process has included a traveling path for tracing the portion which has been machined in the previous process so that a finishing allowance solely is remained (that is, the portion in which rough cutting has been completed). However, the invention is not limited to this, and such a tracing path may be omitted. That is, the traveling path may be a traveling path such as machining solely the portion having a machining allowance larger than the finishing allowance (that is, the portion in which rough cutting is not yet completed).

As such, rough cutting CL data is generated for each combination of the selected tools (steps S16 and S17) Then, the minimum diameter tool (the tool of φ12, in the present embodiment) is set to be used (step S18), so a machining condition is set in correspondence to the to-be-used tool and the workpiece material (step S19) On the basis of the machining condition having been set, data concerning the rotational speed and the feed speed of the tool is generated, and then the traveling position data of the tool in the work coordinate system is generated, so that CL data for finishing is obtained (step S20).

After that, with incrementing the counter n, the processes of steps S6–S20 are repeated, and then when CL data has been generated for all the to-be-machined portions (steps S21 and S22), the generated CL data is stored into the CL data storing section 17. Then the procedure is completed (step S23).

With referring to the CL data stored in the CL data storing section 17 and on the basis of each piece of the rough cutting CL data of the recess 51, the machining time calculating section 18 calculates the machining time for each piece. Specifically, on the basis of the traveling positions and the feed speed of the tool contained in each piece of the CL data, as well as the time necessary for a tool change, the machining time calculating section 18 calculates the machining (operation) time for each piece of the CL data. Then, the data concerning the calculated machining time is stored in a state associated with the corresponding CL data into the CL data storing section 17.

The machine tool data storing section 19 stores data concerning the machine tool. The machine tool data contains the type (such as a machining center and a lathe) and the structure of the machine tool, and is stored through the input unit 32 into the machine tool data storing section 19.

Then, on the basis of the CL data stored in the CL data storing section 17 and the machine tool data stored in the machine tool data storing section 19, the NC program generating section 20 generates an NC program from the traveling positions in the work coordinate system contained in the CL data. At that time, as for the CL data for the rough cutting of the recess 51, the machining time values calculated by the machining time calculating section 18 are referred to (that is, the machining time data stored in the CL data storing section 17 is referred to), so that the rough cutting CL data having the minimum machining time is adopted. As for the CL data for the finishing of the recess 51 and the rough cutting and the finishing of the portion other than the recess 51, the unique CL data generated is used. Then, an NC program for the entirety of the machining is generated from the traveling positions in the work coordinate system contained in each piece of the CL data.

The NC program generated by the NC program generating section 20 is stored into the NC program storing section 21, and then outputted through the output unit 33 appropriately.

The work coordinate system indicates a coordinate system defined relative to the workpiece mounted on a machine tool.

As described above, according to the automatic programming apparatus 1 having the above-mentioned configuration of the present embodiment, data concerning the tools of a plurality of tool groups selected in advance such as to be used in the machining of the recess 51 is first stored into the concave portion machining tool storing section 15.

Then, in the CL data generating section 16, in the generation of the CL data of the rough cutting of the recess 51, the data stored in the concave portion machining tool storing section 15 is referred to, so that one or more tools are selected from the tool group corresponding to the selection signal inputted through the input unit 32, so that a plurality of tool combinations are set such as to include at least the minimum diameter tool. Then, CL data for the rough cutting is generated for each of the tool combinations, and then the machining time calculating section 18 calculates the machining time for each piece of the generated CL data for rough cutting. Then, in the generation of the NC program, the CL data having the minimum machining time is selected, so that an NC program is generated on the basis of the selected CL data.

As such, according to the automatic programming apparatus 1 of the present embodiment, in the generation of the CL data of the recess 51, a plurality of tools are used, and further a plurality of combinations of the tools are set. Then, CL data is generated for each combination, and then the machining time is calculated for each piece of the CL data, so that the CL data having the minimum machining time is adopted, so that an NC program is generated. As a result, this automatic programming apparatus can generate an NC program permitting a reduction in the machining time and hence improving the efficiency in the machining, in comparison with those of the prior art automatic programming apparatus for machining the recess using a single tool (the minimum diameter tool) throughout the machining ranging from rough cutting to finishing.

Further, in the selection of the tools, the person carrying out the machining can set the tool arbitrarily. Thus, the machining know-how of the person carrying out the setting can be reflected in the setting of the selected tools. This permits efficient generation of an NC program for the optimum machining.

Further, a plurality of the tool groups are set for the tools for the machining of the recess 51. Thus, tools suitable for the machining of the recess 51 are selected appropriately from among a plurality of the tool groups. This avoids advantageously the necessity of re-setting the selected tools, for example, in each time when a change occurs in the to-be-machined product shape.

An embodiment of the invention has been described above. However, embodiments for the invention are not limited to the specific one described above.

What is claimed is:

1. An automatic programming apparatus for generating a numerical control (NC) program for causing a cutting tool to machine a workpiece into a product shape having a recess and one or more protrusions formed in a bottom surface inside the recess, said automatic programming apparatus comprising:
   a product shape data storing section for storing shape data defining said product shape;
   a workpiece data storing section for storing data concerning the workpeice;
   a tool data storing section for storing data concerning the cutting tool;
   a machining condition data storing section for storing data concerning a machining condition having been set depending on said workpiece and cutting tool;
   a cutter location (CL) data generating section for setting machining regions and then generating CL data containing at least a cutting tool to be used, a feed speed thereof, and traveling positions of said cutting tool to be used in a work coordinate system for each of said machining regions having been set, on the basis of said data stored in said product shape data storing section, said workpiece data storing section, said tool data storing section, and said machining condition data storing section; and
   an NC program generating section for generating an NC program on the basis of the traveling positions in the work coordinate system contained in the CL data generated by said CL data generating section; wherein
   said automatic programming apparatus further comprises:
   a concave portion machining tool storing section for storing identification data of a plurality of cutting tools that are selected in advance as cutting tools to be used for the machining of said recess from among the cutting tools, the data of which is stored in said tool data storing section, and that have diameters different from each other and include at least: a minimum diameter cutting tool having a diameter smaller than twice a minimum curvature radius of a concave surface inside said recess of said product and than a minimum distance of wall gaps inside said recess; and a cutting tool having a larger diameter than the minimum diameter cutting tool; and
   a machining time calculating section for calculating a machining time on the basis of the CL data generated by said CL data generating section; wherein
   if a machining region having been set is said recess, said CL data generating section performs successively: a combination setting process of referring to the identification data stored in said concave portion machining tool storing section, thereby extracting one or more cutting tools from among a plurality of said cutting tools selected in advance, and thereby setting a plurality of cutting tool combinations including at least said minimum diameter cutting tool; and a CL data generating process of generating, for each of said combinations having been set, rough cutting CL data for rough cutting performed by the successive use of the cutting tools in a descending order of cutting tool diameter starting with the cutting tool having a maximum diameter, and then generating finishing CL data for finishing performed by the use of said minimum diameter cutting tool; wherein said machining time calculating section calculates the machining time for each of said combinations on the basis of the CL data generated for each of said combinations; and wherein said NC program generating section generates said NC program by using the CL data having a minimum machining time among those calculated by said machining time calculating section.

2. An automatic programming apparatus according to claim 1, wherein said concave portion machining tool storing section groups into a tool group a plurality of said cutting tools selected as those to be used for the machining of said recess, and then stores the identification data of constituent tools for each tool group the constituent tools of which are different from each other, and wherein said CL data generating section receives from an outside a signal for selecting a tool group, then refers to the identification data of said tool group corresponding to said selection signal, stored in said concave portion machining tool storing section, and thereby performs said combination setting process and said CL data generating process successively.

* * * * *